(12) United States Patent
Angerer et al.

(10) Patent No.: US 12,565,553 B2
(45) Date of Patent: Mar. 3, 2026

(54) PROCESS FOR PREPARING AQUEOUS POLYMER DISPERSIONS IN A TUBULAR REACTOR

(71) Applicant: WACKER CHEMIE AG, Munich (DE)

(72) Inventors: Michael Angerer, Burghausen (DE); Robert Braunsperger, Emmerting (DE); Peter Schultheiß, Altötting (DE)

(73) Assignee: Wacker Chemie AG, Munich (DE)

( * ) Notice: Subject to any disclaimer, the term of this patent is extended or adjusted under 35 U.S.C. 154(b) by 513 days.

(21) Appl. No.: 18/038,092

(22) PCT Filed: Nov. 23, 2020

(86) PCT No.: PCT/EP2020/083091
§ 371 (c)(1),
(2) Date: May 23, 2023

(87) PCT Pub. No.: WO2022/106041
PCT Pub. Date: May 27, 2022

(65) Prior Publication Data
US 2023/0406978 A1 Dec. 21, 2023

(51) Int. Cl.
*C08F 2/01* (2006.01)
*C08F 2/22* (2006.01)
*C08F 218/08* (2006.01)

(52) U.S. Cl.
CPC .............. *C08F 218/08* (2013.01); *C08F 2/01* (2013.01); *C08F 2/22* (2013.01)

(58) Field of Classification Search
CPC .. C08F 218/08; C08F 2/01; C08F 2/22; C08F 210/02; C08F 2/002
See application file for complete search history.

(56) References Cited

U.S. PATENT DOCUMENTS

| | | | |
|---|---|---|---|
| 4,383,093 A | 5/1983 | Shiraki et al. | |
| 9,068,031 B2 | 6/2015 | Paul et al. | |
| 2009/0131610 A1 | 5/2009 | Sunamori et al. | |
| 2022/0041774 A1 * | 2/2022 | Weitzel | C08F 218/08 |

FOREIGN PATENT DOCUMENTS

| | | | | |
|---|---|---|---|---|
| DE | 1137216 B | | 9/1962 | |
| EP | 0029701 B1 | | 9/1985 | |
| EP | 0446059 A1 | | 9/1991 | |
| EP | 0489211 A1 | | 6/1992 | |
| EP | 1323752 B1 | | 3/2004 | |
| EP | 2471594 A1 | | 7/2012 | |
| EP | 3256497 B1 | | 9/2018 | |
| JP | S 50144792 | * | 11/1975 | |
| JP | S50144792 A | | 11/1975 | |
| WO | 92006083 A1 | | 4/1992 | |
| WO | 2015089823 A1 | | 6/2015 | |
| WO | WO-2020221435 A1 * | | 11/2020 | C08F 218/08 |

OTHER PUBLICATIONS

Rührtechnik—Theorie und Praxis, Marko Zlokarnik, Springer-Verlag, 1999, ISBN: 3-540-64639-6, S. 305-308.
Fox T. G., Bull. Am. Physics Soc. 1, 3, p. 123 (1956).
Polymer Handbook 2nd Edition, JU. Wiley & Sons, New York (1975).

* cited by examiner

*Primary Examiner* — Kumar R Bhushan

(57) ABSTRACT

A process for preparing vinyl acetate-ethylene copolymers in the form of an aqueous dispersion. The process includes providing an aqueous dispersion of vinyl acetate-ethylene copolymers and subjecting the aqueous dispersion of vinyl acetate-ethylene copolymers to radically initiated emulsion polymerization in a continuously operated tubular-reactor. Where one or more dividing plates bearing liquid-permeable openings that are mounted within the tubular-reactor transverse to the flow direction of the reactor contents.

16 Claims, 3 Drawing Sheets

PROCESS FOR PREPARING AQUEOUS POLYMER DISPERSIONS IN A TUBULAR REACTOR

CROSS-REFERENCE TO RELATED APPLICATIONS

This application is a U.S. National Phase application of PCT Application NO. PCT/EP2020/083091 filed on Nov. 23, 2020, which is incorporated by reference herein in its entirety.

The invention relates to processes for preparing vinyl acetate-ethylene copolymers in the form of aqueous dispersions by means of radically initiated emulsion polymerization in a continuously operated tubular reactor and to the use of the process products obtained thereby.

Aqueous polymer dispersions are used in diverse fields of application as binders, such as in adhesives, in coating applications, as binders in carpet, textile and paper applications, and also in chemical construction products, such as tile adhesives, renders and grouts, for example. Such dispersions are typically prepared by aqueous emulsion polymerization in stirred batch reactors or else in continuously operated stirred-tank cascades, as described in EP 1 323 752 B1. The space-time yield and process efficiency of such processes, however, are limited by the restricted removal of heat of reaction from the reactor, via cooling coils or reactor walls, for example. To boost the cooling efficiency, it is possible to use reactors having relatively large surface area-to-volume ratios, examples being tubular reactors.

In the case of emulsion polymerization in tubular reactors, however, there are problems with producing polymers having particle size distributions, especially narrow particle size distributions or particle size distributions which remain the same during the implementation of the process, this being established in batch reactor or stirred-tank cascade processes. In the case of polymerization of gaseous monomers, such as ethylene, in tubular reactors, this problem scenario is further exacerbated.

In tubular reactors, moreover, the formation of deposits, so-called fouling (polymer fouling), also causes particular problems, and may even lead to the blockage of the tubular reactors and in any case drastically reduces the run time and efficiency of the plants when such deposits are removed after the reactors have been shut down. Nor is it possible to avoid the polymer fouling by installing stirrers in tubular reactors, as in the case, for example, of the specific, helical stirrers for tubular polymerization reactors that are described in U.S. Pat. No. 4,383,093. Polymer fouling does also occur in stirred tanks, but is not so serious because of the smaller cooling surface area and different reactor geometry. With coatings of antifouling agent, the buildup of fouling can indeed be sufficiently reduced in stirred tanks, as described in EP 3 256 497 B1, but not in tubular reactors. DE 1137216, US 2015/9068031, WO 2015/089823 and EP 2471594 describe tubular reactors having close-clearance stirrers and/or scrapers. However, rather than preventing the buildup of fouling, this removes it mechanically, which constitutes a mechanical exposure and may, moreover, lead to blockages, and which influences the polymer particle size distribution. EP 0029701 teaches the removal of wall fouling from the tubular reactor by means of pulsating flows. PCT/EP2019/061017 (application number) recommends for this purpose the reversal of the flow direction in the tubular reactor.

The above, as well as other advantages of the present disclosure, will become readily apparent to those skilled in the art from the following detailed description when considered in light of the accompanying drawings in which.

Figure 1:
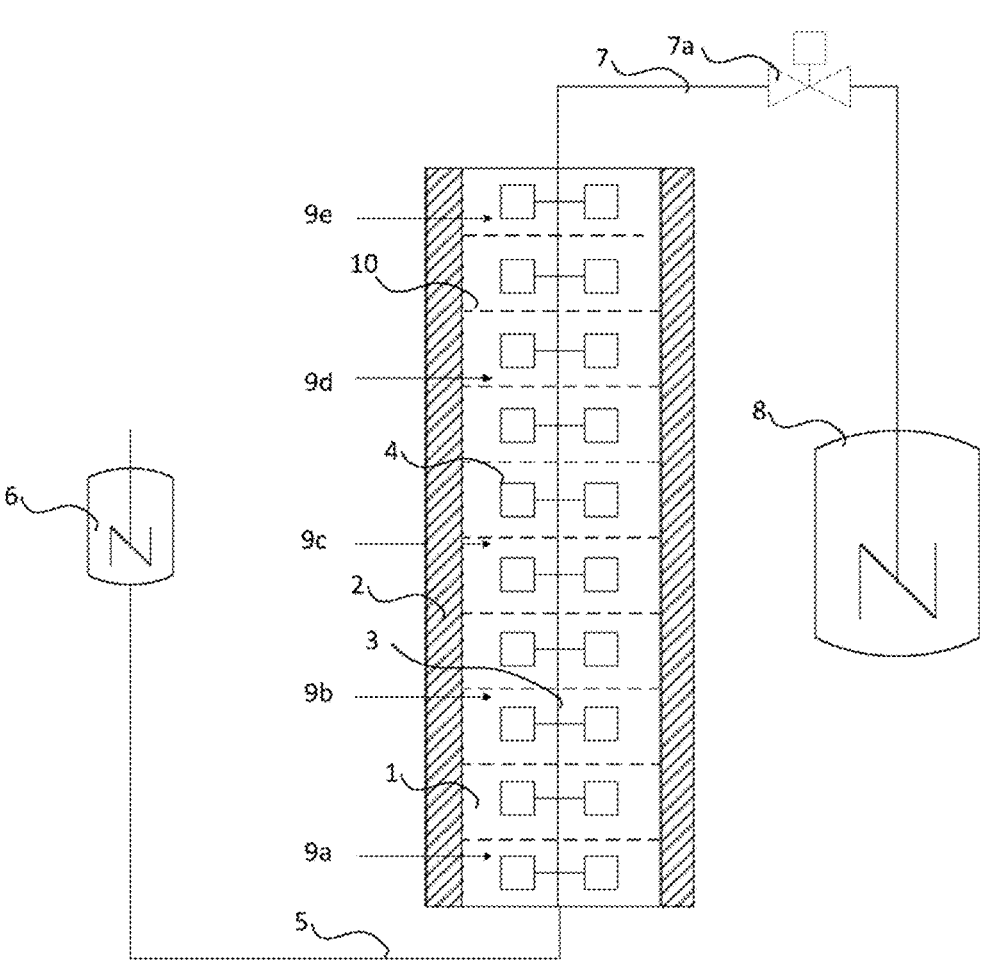
FIG. 1 is a schematic illustration of a tubular reactor according to an embodiment of the disclosure for use in a process according to an embodiment of the disclosure.

Against this background, the object was to provide improved processes for preparing vinyl acetate-ethylene copolymers in the form of aqueous dispersions by means of aqueous emulsion polymerization, in which the space-time performance (process efficiency) can be boosted and at the same time a high level of plant availability can be ensured. During the continuous emulsion polymerization in tubular reactors, moreover, vinyl acetate-ethylene copolymers with a very highly constant particle size distribution ought to be formed. The polymer dispersions obtained in tubular reactors by continuous emulsion polymerization ought also as far as possible to have a profile of properties—such as particle size distribution, modality or viscosity—like that obtained in the case of the conventional emulsion polymerization in stirred batch reactors or continuous stirred-tank cascades.

The object has been achieved for vinyl acetate-ethylene copolymers, surprisingly, by continuous, aqueous emulsion polymerization in tubular reactors which contained one or more dividing plates bearing liquid-permeable openings and mounted transverse to the flow direction of the reactor contents.

Tubular reactors or stirred columns with dividing plates are known per se, from—for example, "Rührtechnik-Theorie and Praxis", Marko Zlokarnik, Springer-Verlag, 1999, ISBN: 3-540-64639-6, pp. 305-308, but not in connection with the preparation of vinyl acetate-ethylene copolymer dispersions.

Subject-matter of the invention are processes for preparing vinyl acetate-ethylene copolymers in the form of aqueous dispersions by means of radically initiated emulsion polymerization in a continuously operated tubular reactor, characterized in that one or more dividing plates bearing liquid-permeable openings are mounted in the tubular reactor transverse to the flow direction of the reactor contents (polymerization mixture).

The dividing plates of the invention, bearing liquid-permeable openings, are also referred to below in abbreviated form as dividing plates.

The flow direction of the reactor contents is also abbreviated below in short as flow direction or transit direction. The flow direction in this context refers generally to the net direction of flow of the reactor contents, i.e., generally, the total flow direction of the reactor contents as a whole. The net direction of flow provides a general description of the overall or overriding flow direction of the reactor contents, and not any local flows, such as turbulent or other undirected flows. The term "reactor contents" refers generally to the polymerization mixture comprising monomers, initiators and water, i.e., generally, the emulsion polymerization mixture contained in the tubular reactor.

The dividing plates are preferably flat components, having preferably the form of a plate, sheet, flat cylinder or ring. Generally, therefore, dividing plates are areal or planar bodies whose areal diameters are substantially greater than their height. In general, the extent of the dividing plates in one dimension is markedly less (edge) than that in the two other dimensions (flat side). Dividing plates generally do not have a helical or screwlike form. The design of the dividing plates is guided preferably by the form of the cross section at the particular point in the tubular reactor at which the respective dividing plate is mounted.

One or more dividing plates, preferably all dividing plates, are installed in the tubular reactor transverse to the transit direction, preferably radial or perpendicular or substantially perpendicular to the transit direction. One or more dividing plates, preferably all dividing plates, are disposed with their flat side parallel or substantially parallel to one another.

The dividing plates are preferably static. The dividing plates are preferably immovable or stationary throughout the emulsion polymerization.

A tubular reactor contains preferably 3 to 30 dividing plates, more preferably 7 to 20 dividing plates and most preferably 10 to 15 dividing plates.

The dividing plates preferably stand with their edge in contact with the inner wall of the tubular reactor, more preferably over the entire periphery of the edge of a dividing plate. Alternatively there may also be one or more seals, examples being rubber, silicone or PTFE seals, or a ring, an example being a metal ring or a metal washer, mounted between dividing plate and inner tubular-reactor wall. There is preferably no free, liquid-permeable gap present between dividing plate and inner tubular-reactor wall. With preference no reactor contents flow through between dividing plate and inner tubular-reactor wall.

The dividing plates may be secured, for example, firmly on the tubular reactor, more particularly at the reactor cover, reactor floor or at the inner tubular-reactor wall, being for example welded on or secured by a mount which is optionally equipped with a seal. The dividing plates are preferably not secured to the inner tubular-reactor wall, more particularly not via their edge to the inner tubular-reactor wall.

With preference one or more, preferably all, adjacent dividing plates are connected to one another by one or more bars. Bars are mounted preferably at flat sides of the dividing plates, more particularly outside the region swept by stirrers. Bars serve generally for static stabilization of the dividing plates and/or tubular reactor.

The construct composed of dividing plates and bars is also referred to as a cage. A cage is fastened preferably at the reactor floor and/or more preferably at the reactor cover. A cage assembly of this kind has the advantage that all of the dividing plates can be removed from the tubular reactor simultaneously and therefore time-efficiently without having to break down the tubular reactor—at cost and effort—into individual parts. Stirrers can also be introduced or replaced simply and time-efficiently in this way.

An or each dividing plate divides the reactor interior into cells, also called compartments. The number of the cells is preferably greater by a number of one than the number of the dividing plates. Two adjacent cells are connected to one another by preferably 2 to 8, more preferably 2 to 6 and most preferably 3 to 4 bars. Reactor contents are able to flow from one cell into the adjacent cell, more particularly in transit direction, through the liquid-permeable openings in the dividing plates. Different cells are in reactor contents exchange communication with one another, especially in transit direction, preferably exclusively by way of the liquid-permeable openings in the dividing plates.

The diameter of a cell divided by the height of a cell is preferably 0.25 to 4, more preferably 0.33 to 3 and most preferably 0.5 to 2. The diameter of a cell corresponds to an internal diameter, preferably to the average internal diameter, of the tubular reactor at the point of the respective cell. The height of a cell is the clear distance between the two dividing plates which confine a cell. With preference all the cells have the same height and/or the same diameter. The aforesaid ratios of diameter to height are preferably within the aforesaid ranges for all the cells. With particular preference, all cells have the same ratio of diameter to height, more particularly at all points of all the cells.

The liquid-permeable openings in the dividing plates may also be referred to as holes. A hole preferably reaches through the entire dividing plate. A hole extends preferably from one flat side to the opposite flat side of a dividing plate. A hole is located preferably in the middle or substantially in the middle of the flat sides of a dividing plate. The dividing plates are therefore preferably perforated dividing plates or hole plates. A dividing plate may have one or more holes. A dividing plate preferably has 1 to 1000 holes, more preferably 1 to 100 holes, more preferably still 1 to 10 holes, very preferably 1 to 5 holes, and most preferably one hole.

The holes may adopt any desired shapes per se. A hole preferably has a circular or substantially circular shape.

Generally speaking, the reactor contents flow through the holes in the dividing plates in the course of flow transit through the tubular reactor. The reactor contents preferably traverse a dividing plate exclusively through the hole or holes in the dividing plate.

The mean flow velocity V of the reactor contents at the point of the free diameter of a hole is preferably ≥0.05%, more preferably ≥0.5% and most preferably ≥1% of the peripheral stirrer velocity. The stated mean flow velocity V is preferably ≤50%, more preferably ≤10% and most preferably ≤5% of the peripheral stirrer velocity. The peripheral stirrer velocity is calculated as follows: pi $\pi$ multiplied by the stirrer diameter multiplied by the stirrer speed. The stirrer diameter is generally the widest radius of the stirrer radially to the stirrer shaft—in the case of a blade stirrer, therefore, generally the distance between two opposite stirrer blade tips that are at the furthest distance from one another. The mean flow velocity V of the reactor contents is generally obtained by dividing the volume flow through the tubular reactor by the free passage area of a hole. The free passage area of a hole is generally the smallest free area present radially with respect to the main flow direction in a hole. In the case of circular holes, and particularly in the case of circular holes where the passage is unhindered over the entire hole area, the free diameter generally corresponds to the hole diameter. In the case of noncircular holes, the free diameter is generally obtained by dividing the free passage area of the hole by the hole circumference and multiplying the result by four. The volume flow through the reactor is obtained by dividing the mass flow through the reactor by the density of said flow. In the case of multiphase flows, the general approach is to determine mass flow and density for each phase and to add up the resulting volume flows. The mass flow and the density of single-phase or multiphase fluids may be measured, for example, by means of Coriolis flowmeters at the entry and exit of the reactor. The free diameter of a hole and/or the peripheral stirrer velocity are/is preferably chosen such that the mean flow velocity of the reactor contents is within the aforesaid range.

At one or more, preferably all, of the holes in the dividing plates, guide plates may be mounted. The guide plates are located preferably at the edge of a hole and extend preferably over the entire edge of a hole. Guide plates are preferably mounted perpendicular to the dividing plates.

Guide plates are preferably oriented parallel to the stirrer shaft. A guide plate extending preferably over the entire edge of the hole is preferably mounted at a hole. Guide plates may protrude, for example, into the two cells divided by a dividing plate. A guide plate preferably protrudes only into one cell. Guide plates are mounted preferably on that side of the dividing plate that is situated upstream and/or more preferably downstream in flow direction or main flow direction. Guide plates are advantageous for the preparation of copolymers having the desired particles sizes and particle size distributions.

Guide plates protrude preferably by the length L into the two cells divided by a dividing plate. The ratio of the length L of a guide plate to a free diameter of a hole is preferably ≥0.25, more preferably ≥0.5 and most preferably ≥1. The aforesaid ratio is preferably ≤10, more preferably ≤5 and most preferably ≤2.

Alternatively to guide plates, it is also possible to use thick dividing plates. The thickness L of a dividing plate preferably realizes the aforesaid ratios of L of a guide plate to the free diameter of a hole.

It is possible to employ tubular reactors without stirrer. Preference is given to tubular reactors with stirrer, examples being blade stirrers, disk stirrers, bar stirrers or Rushton turbines. The active direction of the stirrer or the direction of displacement by the stirrer is preferably radial or perpendicular to the flow direction of the reactor contents. The active direction of the stirrer is preferably not in the flow direction of the reactor contents. Two or more or, preferably, one stirrer may be mounted per cell.

Particular preference is given to tubular reactors having a stirring assembly comprising a stirrer shaft at which one or more stirrers, more particularly stirrer blades, are mounted. The stirrer shaft is oriented preferably in the direction of the transit direction. The stirrer shaft is preferably disposed parallel or substantially parallel to the transit direction and/or concentric or substantially concentric to the diameter of the tubular reactor. The stirrer shaft extends preferably over one or more cells and more preferably over all the cells. A stirrer shaft extends preferably from one longitudinal end to the other longitudinal end of a tubular reactor. The stirrer shaft is preferably routed through a hole in a dividing plate, the stirrer shaft being more preferably routed through a hole in each dividing plate located in the tubular reactor. The stirrer shaft preferably does not fill a hole completely. A stirrer shaft located in a hole preferably leaves a free gap between stirrer shaft and dividing plate. One or more stirrers, especially stirrer blades, are mounted at the stirrer shaft in preferably one or more cells, more preferably in all the cells. A tubular reactor contains preferably a stirring assembly or a stirrer shaft.

The overall net flow velocity U of the reactor contents along the stirrer shaft is preferably smaller by at least 2 orders of magnitude, more preferably smaller by at least 3 orders of magnitude and most preferably smaller by at least 4 orders of magnitude than the peripheral stirrer velocity. These figures refer preferably to any desired point on the stirrer shaft in the tubular reactor. The overall net flow velocity U may be calculated by dividing the volume flow through the reactor by the cross-sectional area of the reactor.

The speed of the stirrer or of the stirrer shaft is also governed, as usual, by the overall sizing of the tubular reactor, and is preferably between 100 and 10 000 revolutions per minute and more preferably between 200 and 2000 revolutions per minute. One revolution represents a revolution of the stirrer or of the stirrer shaft about its longitudinal axis or about the axis which is parallel to the transit direction. The stirrer or the stirring assembly may be driven in a customary way, for example, via a mechanical transmission or sealed via a magnetic coupling and optionally via a sliding-ring seal.

One characteristic of the tubular reactor is the ratio of its length to diameter. The length corresponds generally to the dimension of the tubular reactor in transit direction, and the diameter generally to the dimension of the tubular reactor transverse to the transit direction. The length and the diameter of the tubular reactor refer here preferably to the corresponding clear widths of the interior of the tubular reactor. The ratio of length to diameter is preferably 8:1 to 40:1, more preferably 10:1 to 25:1. With this parameter as well it is possible to influence the particle size distribution of the polymer particles.

Relative to its longitudinal direction or to the transit direction, the tubular reactor may be disposed vertically horizontally or in a position between these two directions. The longitudinal direction of the tubular reactor is, generally, the section from the reactor floor to the reactor cover. The vertical disposition is preferred. If the tubular reactor is not disposed horizontally, the reactor contents may flow through it under gravity from top to bottom or, preferably, flow through it in opposition to gravity, from bottom to top.

The transit direction in the tubular reactor may for example be reversed or changed during the implementation of the process of the invention. Alternatively or preferably, the transit direction in the tubular reactor is not reversed or changed during the implementation of the process of the invention.

The tubular reactors may otherwise be constructed in a customary way. The tubular reactors may take on any desired forms. Preferred tubular reactors are those with tubelike or cylindrical geometry, more preferably with uniform cylindrical geometry. Examples of tubular reactors are flow tubes, tubular reactors with internals (e.g., static mixers), tube bundle reactors, loop reactors, Taylor reactors and tube-in-tube reactors.

The mean residence time of the reactor contents in the tubular reactor is preferably 10 minutes to 5 hours, more preferably 15 minutes to 3 hours, most preferably 20 minutes to 2 hours, and absolutely most preferably minutes to 90 minutes. The mean residence time may be adjusted, for example, by way of the flow velocity of the reactor contents, the rate of the metered additions or the sizing of the tubular reactor.

The residence time distribution of the reactor contents in the tubular reactor may be characterized, for example, by the Bodenstein number Bo. The Bodenstein number Bo is preferably ≥15, more preferably ≥20 and most preferably ≥25. The Bodenstein number Bo is preferably ≤200, more preferably ≤150 and most preferably ≤100.

The Bodenstein number Bo may be calculated, for example, with the following formula:

$$E_\theta(\theta) = 0.5 \cdot \sqrt{\frac{Bo}{\pi \cdot \theta}} \cdot \exp\left(-\frac{(1-\theta)^2 \cdot Bo}{4 \cdot \theta}\right);$$

$E_\theta(\theta)$ is the dimensionless residence time distribution and is obtained using the formula: $E_\theta(\theta) = E(t) \cdot \tau$;

$\tau$ is the residence time and is computed from the reactor volume divided by the volume flow. The volume flow through the reactor may be calculated by dividing the mass flow through the reactor by the density thereof. Both values may be measured in a conventional way, for example, using Coriolis flowmeters at the reactor entry and exit. Where different volume flows are obtained at the entry and exit, the arithmetic mean is used preferably for the calculation. The dimensionless time $\theta = t/\tau$ is calculated from the residence time by dividing the prevailing time t by the residence time $\tau$. The residence time distribution E(t) may be determined experimentally in a conventional way, as for example via what is called a step response. A step response may be measured, for example, via the stepwise change in the concentration of a dissolved salt, such as sodium chloride, in the feed of he tubular reactor and the time-resolved measurement of the subsequent change in concentration of the dissolved salt at the reactor exit, by means of a conductivity probe, for example.

Furthermore, the tubular reactors may also include internals, such as static mixing elements. One or more baffles may be mounted in the tubular reactor, axial—for example—to the flow direction of the reactor contents. The tubular reactor preferably contains two, more preferably three and most preferably four baffles per cell. This as well may contribute to more effective achievement of the object according to the invention.

Additionally, a tubular reactor is equipped generally with one or more metering lines, which are optionally connected to an upstream mixing unit. Via metering lines it is possible, generally, to introduce reactants or other starting materials, preferably continuously, into the tubular reactor. In the mixing unit it is possible, generally, to mix reactants or other starting materials. One or more metering lines may be mounted on one or more cells. Via metered addition at different points in the tubular reactor, it is possible to influence the particle size distribution of the copolymers and also the fouling and the space-time yield of the tubular reactor.

A tubular reactor may be equipped, for example, with 1 to 100, preferably 2 to 75, more preferably 3 to 50 and most preferably 5 to 30 metering lines.

The temperature of the tubular reactor may be conditioned, generally, with customary cooling and/or heating facilities, such as with jacket coolers or jacket heaters, for example. Cooling and/or heating facilities may be mounted, for example, on the tubular reactor, on the wall, or on installed cooling coils. The outer reactor wall, for example, may bear a cooling or heating jacket (jacket tube) whose intermediate space carries a flow of a conditioning fluid. For example, there may be tubular coils installed in the reactor volume, with a conditioning fluid flowing through these coils. A tubular reactor with tubular coils is used preferably.

The conditioning may be divided into multiple zones, in which the conditioning fluid is used at different entry temperatures and/or mass flows. It is possible accordingly to exert a targeted influence over the temperature profile during the reaction. In this way as well it is possible to influence the particle size distribution of the copolymers and also the fouling and the space-time yield of the tubular reactor.

The tubular reactors may contain close-clearance stirrers, scrapers and/or wiper blades. The tubular reactors preferably do not contain any close-clearance stirrers, any scrapers and/or any wiper blades. Accessory components of these kinds can be used for removing built-up deposits, but advantageously are not needed in accordance with the invention.

The tubular reactors, baffles, guide plates, stirrers, stirring assemblies or the other constituents of the tubular reactors may be constructed of customary materials, such as stainless steel, for example.

One preferred configuration of a tubular reactor for implementing the process of the invention is represented illustratively in FIG. 1 in reference to tubular reactor (1). The embodiment in FIG. 1 is purely illustrative and serves to elucidate the process, and is in no way limiting on the present invention.

The tubular reactor (1) in which the emulsion polymerization takes place is constructed of a steel tube, preferably a double jacket tube (2), which in the interior has an axially disposed stirrer shaft (3) which is fitted with a plurality of stirrers (4). The tubular reactor (1) is divided by nine dividing plates (10) into 10 cells. The tubular reactor (1) is equipped with a metering line (5) which is connected to an upstream mixing unit (6) for mixing the reactants. The tubular reactor (1) is connected via an offtake line (7) to a downstream vessel (8) in which the polymerization product is collected and optionally aftertreated.

The starting materials may be introduced, preferably continuously, into the tubular reactor (1) via the metering line (5). The polymerization product may be removed from the tubular reactor (1), preferably continuously, through the offtake line (7). Further substances, preferably initiators, may be supplied to the tubular reactor via one or more further metering facilities (9a) to (9e), along the tubular reactor.

Figure 3:
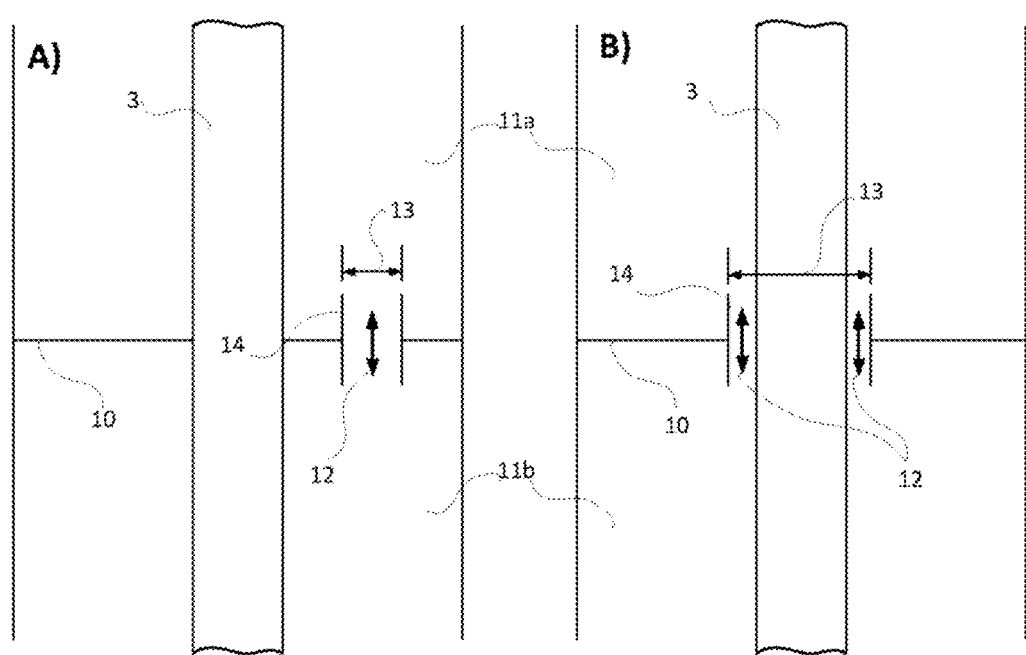
FIG. 3 is a schematic illustration of two embodiments of a tubular reactor A) and B) according to an embodiment of the disclosure for use in a process according to an embodiment of the disclosure.

FIG. 3 shows, illustratively, two preferred embodiments A) and B). In these embodiments, dividing plate (10) divides the two cells (11a) and (11b). Through the liquid-permeable opening (13) in the dividing plate (10), the reactor contents (12) are able to flow from cell (11a) into cell (11b) or oppositely. A guide plate (14) is mounted around the entire edge of the liquid-permeable opening (13). A liquid-permeable opening (13) equipped with guide plate (14) may be located at any desired point on the dividing plate (10). A stirrer shaft (3) is preferably routed through a liquid-permeable opening (13) equipped with guide plate (14), as shown in embodiment B) of FIG. 3. Alternatively, no stirrer shaft (3) is routed through a liquid-permeable opening (13) equipped with guide plate (14), as shown in embodiment A) of FIG. 3.

The polymerization takes place by the emulsion polymerization process in an aqueous medium—preferably there are no organic solvents used. The polymerization temperature of the polymerization mixture in the tubular reactor is preferably between 40° C. and 140° C. and more preferably between 50° C. and 120° C. The pressure in the tubular reactor is dependent on whether the monomers to be polymerized are in liquid or gas form at the prevailing polymerization temperature, and is preferably 1 to 110 $\text{bar}_{abs}$. Polymerization takes place under pressure in the case of the copolymerization of gaseous comonomers such as ethylene, 1,3-butadiene or vinyl chloride, and more preferably at 10 to 80 $\text{bar}_{abs}$.

One or more constituents of the reaction mixture or of the polymerization mixture (starting materials) may be blended beforehand in a mixing unit to form a preliminary emulsion and supplied continuously to the tubular reactor. The constituents of the reaction mixture are preferably blended continuously in a mixing unit to form a preliminary emulsion, which is transported into the tubular reactor. In the case of a thermal initiation, the procedure is preferably such that no oxidation catalyst is added to the preliminary emulsion. In the case of initiation using a redox initiator combination, the procedure is preferably such that the reduction initiator is added to the preliminary emulsion and the oxidation initiator is added, preferably separately from the preliminary emulsion, to the tubular reactor. Transport takes place by means of pumps or by way of the pure flow of mass when the mixing unit is completely filled. The mixing unit may comprise, for example, a stirred tank or a static mixing section. The mixing unit may bear a jacket, for optional cooling or heating during the mixing.

One preferred mixture (preliminary emulsion) comprises one or more ethylenically unsaturated monomers, one or more protective colloids and/or one or more emulsifiers, and optionally one or more initiators, especially reduction initiators, more particularly no oxidation initiators. The total amount of ethylenically unsaturated monomers, protective colloids and/or emulsifiers is preferably introduced into the preliminary emulsion. The preliminary emulsion may be introduced into the tubular reactor by way of one or more metering lines. The preliminary emulsion is preferably introduced at the end of the tubular reactor which lies opposite the withdrawal point. Preferably, one or more initiators, especially oxidation initiators, are added via one or more further metering lines, preferably to at least two cells, more preferably to at least 3 cells and most preferably to at least four cells. Oxidation initiator as well is metered preferably into the cell into which preliminary emulsion is introduced, this initiator being metered in particular via a separate metering line. These measures as well are useful for better achieving the object according to the invention.

The starting materials may be conditioned prior to introduction into the tubular reactor. For example, on introduction into the tubular reactor, one or more starting materials may be conditioned to a temperature just below the polymerization temperature or to polymerization temperature, preferably between 10° C. and the polymerization temperature. The aforesaid mixtures are preferably conditioned to a temperature between the polymerization temperature and 20° C. below the polymerization temperature, more particularly to 10° C. below the polymerization temperature.

Before the start of the polymerization, the tubular reactor is charged preferably with a polymer dispersion, which preferably corresponds to the end product of the polymerization in terms of polymer composition, nature and amount of the protective colloid, and also particle size and solids content. The tubular reactor may alternatively be charged before the start of the process of the invention, meaning before the start of the polymerization, with a mixture which comprises the starting materials but no initiators, more particularly no oxidation initiators. Lastly, the tubular reactor before the start of the process of the invention may be charged with water, preferably exclusively with water.

The tubular reactor is generally operated continuously. In continuous operation, the starting materials, especially ethylenically unsaturated monomers, protective colloids and/or emulsifiers and/or initiators, are introduced into the tubular reactor and the polymerization product is withdrawn from the tubular reactor during the emulsion polymerization. In continuous operation, the mass flows entering are to correspond to the mass flows emerging.

The polymerization is conducted in general through to a conversion of at least 80 wt %, preferably to a conversion of 85 to 99 wt %, of the monomers liquid under polymerization conditions. The polymerization product may subsequently be transferred, for example, to a collecting vessel (depressurizing vessel). The transport is accomplished generally by means of pumps or on the basis of the pressure difference between tubular reactor and collecting vessel. In the collecting vessel, postpolymerization may optionally take place, employing known methods—for example, by postpolymerization initiated with redox catalyst. The volatile residual monomer fraction is optionally removed subsequently by the passage of inert entraining gases such as air, nitrogen or preferably steam over or through the aqueous polymerization mixture, in a manner known to the skilled person (stripping). Following its aftertreatment, the polymerization product is withdrawn from the collecting vessel and stored, for example, in a silo. Alternatively, the depressurizing step, any postpolymerization or stripping may also be performed continuously.

The ethylenically unsaturated monomers are preferably selected from the group encompassing vinyl esters, (meth) acrylic esters, vinylaromatics, olefins, 1,3-dienes and vinyl halides, and optionally further monomers copolymerizable therewith.

Suitable vinyl esters are those of carboxylic acids having 1 to 18 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 9 to 11 carbon atoms, as for example VeoVa9® or VeoVa100 (trade names of the company Hexion). Particularly preferred is vinyl acetate.

Suitable monomers from the group of the acrylic esters or methacrylic esters are, for example, esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, 2-ethylhexyl acrylate. Particularly preferred are methyl acrylate, methyl methacrylate, n-butyl acrylate, tert-butyl acrylate and 2-ethylhexyl acrylate.

Preferred vinylaromatics are styrene, methylstyrene and vinyltoluene. A preferred vinyl halide is vinyl chloride. The preferred olefins are ethylene, propylene, and the preferred dienes are 1,3-butadiene and isoprene.

It is optionally possible for 0 to 10 wt % of auxiliary monomers to be copolymerized, based on the total weight of the monomer mixture. With preference 0.1 to 5 wt % of auxiliary monomers are used. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carbonitriles, preferably acrylamide and acrylonitrile; monoesters and diesters of fumaric acid and maleic acid such as the diethyl and diisopropyl esters and also maleic anhydride; ethylenically unsaturated sulfonic acids and their salts, preferably vinylsulfonic acid, 2-acrylamido-2-methylpropanesulfonic acid. Further examples are precrosslinking comonomers such as polyethylenically unsaturated comonomers, examples being diallyl phthalate, divinyl adipate, diallyl maleate, allyl methacrylate and triallyl cyanurate, or postcrosslinking comonomers, examples being acrylamidoglycolic acid (AGA), methylacrylamido-glycolic acid methyl ester (MAGME), N-methylol-acrylamide (NMA), N-methylolmethacrylamide, N-methylolallyl-carbamate, alkyl ethers such as the isobutoxy ether or esters of N-methylolacrylamide, of N-methylolmethacrylamide and of N-methylolallylcarbamate. Also suitable are epoxide-functional comonomers such as glycidyl methacrylate and glycidyl acrylate. Further examples are silicon-functional comonomers, such as acryloyloxypropyltri(alkoxy)- and methacryloyloxypropyltri(alkoxy)-silanes, vinyltrialkoxysilanes and vinylmethyldialkoxysilanes, where examples of alkoxy groups present may be ethoxy and ethoxypropylene glycol ether radicals. Mention may also be made of monomers having hydroxyl or CO groups, examples being methacrylic and acrylic hydroxyalkyl esters such as hydroxyethyl, hydroxylpropyl or hydroxybutyl acrylate or methacrylate, and also compounds such as diacetoneacrylamide and acetylacetoxyethyl acrylate.

Preferred are one or more monomers selected from the group encompassing vinyl esters; vinyl ester mixtures containing multiple monomers from the group encompassing vinyl esters, olefins, vinylaromatics, vinyl halides, acrylic esters, methacrylic esters, fumaric and/or maleic monoesters or diesters; (meth)acrylic esters; (meth)acrylic ester mixtures containing one or more monomers from the group encompassing methacrylic esters, acrylic esters, olefins, vinylaromatics, vinyl halides, fumaric and/or maleic monoesters or diesters; monomers or monomer mixtures of dienes such as butadiene or isoprene, and also of olefins such as ethene or propene, where the dienes may be copolymerized, for example, with styrene, (meth)acrylic esters or the esters of fumaric or maleic acid; monomers or monomer mixtures of vinylaromatics, such as styrene, methylstyrene, vinyltoluene; monomers or monomer mixtures of vinyl halogen compounds such as vinyl chloride, where the monomer mixtures may further comprise auxiliary monomers.

Particularly preferred are monomer mixtures of vinyl acetate with 1 to 50 wt % of ethylene; monomer mixtures of vinyl acetate with 1 to 50 wt % of ethylene and 1 to 50 % of one or more further comonomers from the group of the vinyl esters having 3 to 12 carbon atoms in the carboxylic acid radical such as vinyl propionate, vinyl laurate, vinyl esters of alpha-branched carboxylic acids having 9 to 11 carbon atoms such as VeoVa9®, VeoVa10®, monomer mixtures of one or more vinyl esters, 1 to 50 wt % of ethylene and preferably 1 to 60 wt % of (meth)acrylic esters of unbranched or branched alcohols having 1 to 15 carbon atoms, more particularly n-butyl acrylate or 2-ethyl-hexyl acrylate; monomer mixtures with 30 to 75 wt % of vinyl acetate, 1 to 30 wt % of vinyl laurate or vinyl ester of an alpha-branched carboxylic acid having 9 to 11 carbon atoms, and also 1 to 30 wt % of (meth)acrylic esters of unbranched or branched alcohols having 1 to 15 carbon atoms, more particularly n-butyl acrylate or 2-ethylhexyl acrylate, which further contain 1 to 40 wt % of ethylene; monomer mixtures with one or more vinyl esters, 1 to 50 wt % of ethylene and 1 to 60 wt % of vinyl chloride; the stated monomer mixtures may each additionally contain the stated auxiliary monomers in the stated amounts, and the figures in wt % add up to 100 wt % in each case.

Also particularly preferred are (meth)acrylic ester monomer mixtures, such as monomer mixtures of n-butyl acrylate or 2-ethylhexyl acrylate or copolymers of methyl methacrylate with n-butyl acrylate and/or 2-ethylhexyl acrylate; styrene-acrylic ester monomer mixtures with one or more monomers from the group of methyl acrylate, ethyl acrylate, propyl acrylate, n-butyl acrylate and 2-ethylhexyl acrylate; vinyl acetate-acrylic ester monomer mixtures with one or more monomers from the group of methyl acrylate, ethyl acrylate, propyl acrylate, n-butyl acrylate and 2-ethylhexyl acrylate and optionally ethylene; styrene-1,3-butadiene monomer mixtures; the stated monomer mixtures may further contain auxiliary monomers in the stated amounts, and the figures in wt % add up to 100 wt % in each case.

Examples of particularly preferred comonomers for vinyl chloride monomer mixtures are α-olefins such as ethylene and propylene, vinyl esters such as vinyl acetate, acrylic esters and methacrylic esters of alcohols having 1 to 15 carbon atoms such as methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate, 2-ethylhexyl acrylate, fumaric and maleic monoesters or diesters such as the dimethyl and diethyl esters of maleic acid and fumaric acid.

The most preferred are monomer mixtures with vinyl acetate and 5 to 50 wt % of ethylene; monomer mixtures with vinyl acetate and 1 to 50 wt % of ethylene and 1 to 50 wt % of a vinyl ester of α-branched monocarboxylic acids having 9 to 11 carbon atoms; monomer mixtures with 30 to 75 wt % of vinyl acetate, 1 to 30 wt % of vinyl laurate or a vinyl ester of an α-branched carboxylic acid having 9 to 11 carbon atoms, and also 1 to 30 wt % of (meth)acrylic esters of unbranched or branched alcohols having 1 to 15 carbon atoms, which may optionally further contain 1 to 40 wt % of ethylene; monomer mixtures with vinyl acetate, 5 to 50 wt % of ethylene and 1 to 60 wt % of vinyl chloride; and also monomer mixtures containing 60 to 98 wt % of vinyl chloride and 1 to wt % of ethylene, where the monomer mixtures may in each case additionally contain auxiliary monomers in the stated amounts, and the figures in wt % add up to 100 wt % in each case.

The monomer selection and the selection of the weight fractions of the comonomers are made such that in general the resulting glass transition temperature Tg is −50° C. to +50° C., preferably −20° C. to +30° C. The glass transition temperature Tg of the polymers may be ascertained in a known way by means of differential scanning calorimetry (DSC). The Tg may also be calculated approximately in advance using the Fox equation. According to Fox T. G., Bull. Am. Physics Soc. 1, 3, page 123 (1956): $1/Tg=x1/Tg1+x2/Tg2+ . . . +xn/Tgn$, where xn stands for the mass fraction (wt %/100) of the monomer n and Tgn is the glass transition temperature in kelvins of the homopolymer of the monomer n. Tg values for homopolymers are listed in Polymer Handbook 2nd Edition, John Wiley & Sons, New York (1975).

The polymerization is initiated with the initiators commonplace for emulsion polymerization, especially redox initiator combinations composed of oxidation initiator and reduction initiator. Examples of suitable oxidation initiators are the sodium, potassium and ammonium salts of peroxodisulfuric acid, hydrogen peroxide and azobisisobutyronitrile. Preference is given to the sodium, potassium and ammonium salts of peroxydisulfuric acid and hydrogen peroxide. The stated initiators are used in general in an amount of 0.01 to 2.0 wt %, based on the total weight of the monomers.

Suitable reducing agents (reduction initiators) are the sulfites and bisulfites of the alkali metals and of ammonium, an example being sodium sulfite; the derivatives of sulfoxylic acid such as zinc or alkali metal formaldehyde-sulfoxylates, an example being sodium hydroxymethanesulfinate (Brüggolite), and ascorbic acid, isoascorbic acid or salts thereof; or formaldehyde-free reducing agents such as the disodium salt of 2-hydroxy-2-sulfinatoacetic acid (Brüggolite FF6). The amount of reducing agent is preferably 0.015 to 3 wt %, based on the total weight of the monomers.

Regulating substances may be used during the polymerization for controlling the molecular weight. If such regulators are used, they are used typically in amounts between 0.01 to 5.0 wt %, based on the monomers to be polymerized. Examples of such substances are n-dodecyl mercaptan, tert-dodecyl mercaptan, mercaptopropionic acid, ethyl mercaptopropionate, isopropanol and acetalahyde. With preference no regulating substances are used.

Polymerization takes place preferably in the presence of protective colloids. Suitable protective colloids are partially hydrolyzed polyvinyl alcohols; polyvinylpyrrolidones; polyvinyl acetals; polysaccharides in water-soluble form such as starches (amylose and amylopectin), celluloses and their carboxymethyl, methyl, hydroxyethyl and hydroxypropyl derivatives; proteins such as casein or caseinate, soy protein, gelatin, lignosulfonates; synthetic polymers such as poly(meth)acrylic acid, copolymers of (meth)acrylates with carboxyl-functional comonomer units, poly(meth)acrylamide, polyvinyl-sulfonic acids and the water-soluble copolymers thereof; melamine-formaldehydesulfonates, naphthalene-formaldehydesulfonates, styrene-maleic acid and vinyl ether-maleic acid copolymers; cationic polymers such as polydiallyldimethylammonium chloride (poly-DADMAC).

Preferred protective colloids are partially hydrolyzed or fully hydrolyzed polyvinyl alcohols. Particularly preferred are partially hydrolyzed polyvinyl alcohols having a degree of hydrolysis of 80 to 95 mol % and a Höppler viscosity, in 4% aqueous solution, of 1 to 30 mPas (Höppler method at 20° C., DIN 53015). Also particularly preferred are partially hydrolyzed, hydrophobically modified polyvinyl alcohols having a degree of hydrolysis of to 95 mol % and a Höppler viscosity in 4% aqueous solution, of 1 to mPas. Examples thereof are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, and olefins such as ethene and decene. The fraction of the hydrophobic units is preferably 0.1 to 10 wt %, based on the total weight of the partially hydrolyzed polyvinyl alcohol. Mixtures of the stated polyvinyl alcohols may also be used.

The most preferred are polyvinyl alcohols having a degree of hydrolysis of to 94 mol % and a Höppler viscosity, in 4% aqueous solution, of 3 to mPas (Höppler method at 20° C., DIN 53015). The stated protective colloids are accessible by means of processes known to the skilled person, or are available commercially.

The protective colloids are added in general in an amount of in total 1 to 20 wt %, based on the total weight of the monomers, in the polymerization.

It is possible optionally to use emulsifiers in the polymerization, examples being anionic and/or nonionic emulsifiers, at 0.1 to 2.0 wt %, for example, based on the total weight of the comonomers. Examples of anionic emulsifiers are alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, full esters and monoesters of sulfosuccinic acid with monohydric alcohols. Examples of nonionic emulsifiers are $C_{12}$-$C_{14}$ fatty alcohol ethoxylates having a degree of ethoxylation of 2 to 20 ethylene oxide units.

The aqueous dispersions obtainable with the process of the invention have a solids content of 30 to 75 wt %, preferably of 50 to 60 wt %.

The Brookfield viscosity of the aqueous dispersions of the vinyl acetate-ethylene copolymers is preferably 50 to 5000 mPas, more preferably 100 to 3500 mPas (determined with a Brookfield viscometer at 23° C. and 20 rpm at a dispersion solids content of 49 to 51 wt %).

The vinyl acetate ethylene copolymers have mean particle diameters Dw of preferably 100 nm to 10 μm, more preferably 200 nm to 5 μm and most preferably 500 nm to 3.5 μm. The vinyl acetate-ethylene copolymers have a polydispersity PD of preferably 30, more preferably PD 20, more preferably still PD 10, very preferably PD 5 and most preferably PD 2. The polydispersity PD stands for the ratio of weight-average particle diameter Dw to number-average particle diameter Dn, PD=Dw/Dn. The parameters Dw and Dn are determined by laser light diffraction and laser light scattering with the LS13320 instrument with the optical model PVAC.RF780D, including PIDS, from Beckman-Coulter, using the physical constants for polyvinyl acetate and observing the protocol of the instrument manufacturer.

The aqueous dispersions may be used for producing water-redispersible polymer powders. For that purpose, the aqueous dispersions, optionally after addition of protective colloids as an atomizing aid, are dried by fluidized bed drying, freeze drying or, preferably, spray drying.

The aqueous polymer dispersions and the water-redispersible polymer powders may be used in the areas of usage typical for them. For example, in chemical construction products, optionally in conjunction with hydraulically setting binders such as cements, gypsum and waterglass, for producing construction adhesives, more particularly tile adhesives and external insulation and finishing system adhesives, renders, filling compounds, floor filling compounds, leveling compounds, grouts, jointing mortars and paints. Additionally, as binders for coating materials and adhesive materials or as coating materials or binders for textiles and paper.

Surprisingly it is possible with the process of the invention, also during the time profile of the continuous emulsion polymerization, to obtain vinyl acetate-ethylene copolymers having a consistent profile of properties, such as particle size distribution, modality or viscosity. Accordingly it is possible in the invention to substitute dispersions prepared by continuous polymerization for polymer dispersions produced conventionally in batch reactors, semibatch reactors or continuous stirred-tank cascades. In comparison to batch, semibatch or stirred-tank cascade processes, it is possible in the invention to boost the space-time performance (process efficiency). Relative to stirred-tank cascades, it is also possible to improve the quality of the copolymers, such as particle size distribution, modality or viscosity. Relative to stirred-tank cascades, moreover, it is possible to reduce the consumption of initiator.

Through the process of the invention, the formation of deposits (fouling) is surprisingly reduced by comparison with conventional tubular reactors, resulting in shortened outage times of the tubular reactor for the removal of the deposits, with advantageous consequences for the space-time performance (process efficiency) as well, and with a higher level of plant availability being achieved as a result. In accordance with the invention it is also possible advantageously to achieve tight residence times for the reactor contents in the tubular reactor.

The examples which follow serve for further elucidation of the invention:

General Experimental Description

The polymerization was carried out in a tubular reactor (1) having a length of 1600 mm and an internal diameter of 100 mm. The reactor volume was 12.5 liters. The reaction mixture was mixed transverse to the longitudinal axis by a stirrer (3) having multiple stirrer blades (4) with dimensions of 50 mm×50 mm; the distance of the stirrer blades from the reactor wall was 25 mm and so contact with the reactor wall was avoided. Along the reactor axis there were an additional 5 further addition facilities (9a) to (9e) for initiator.

The tubular reactor (1) was fed continuously with the composition for polymerization from an upstream pressure vessel (6) having a volume of 16 liters. The upstream pressure vessel (6) was charged continuously with the corresponding compounds via pumps.

Following emergence from the tubular reactor (1), the product was transferred via a pressure-maintenance valve (7a) into an unpressurized container (8) having a volume of 1000 liters, where it was collected. At the end of the experiment, the product mixture was aftertreated and discharged.

Composition for Polymerization:

The following compounds were supplied continuously to an upstream pressure vessel (stirred tank) (6) and premixed:

4.4 kg/h of water, 4.0 kg/h of a 20 wt % aqueous solution of a partially hydrolyzed polyvinyl alcohol having a degree of hydrolysis of 88 mol % and a Höppler viscosity of 4 mPas (determined according to DIN 53015 at 20° C. in 4 wt % aqueous solution), 10.4 kg/h of vinyl acetate, 1.15 kg/h of ethylene, 195 g/h of 5 wt % aqueous ascorbic acid solution, 1.5 g/h of formic acid and 4 g/h of 1 wt % aqueous iron ammonium sulfate solution.

The composition for polymerization was transferred into the tubular reactor (1) at a rate of 20 kg/h.

Potassium persulfate as initiator, in the form of a 3 wt % aqueous solution, was metered in at the metering points (9a) to (9e).

The finished product left the tubular reactor (1) with a conversion of 92% and was collected under reduced pressure in an unpressurized vessel (8).

After this, for removing excess ethylene, the dispersion was transferred to a further unpressurized vessel, in which a pressure of 0.7 bar was applied, and was postpolymerized therein by addition of 0.4 kg of a 10 wt % aqueous tert-butyl hydroperoxide solution and 0.8 kg of a 5 wt % aqueous ascorbic acid solution, based on 100 kg of dispersion, until the residual vinyl acetate value was <1000 ppm. The pH was adjusted to 4.5 by addition of sodium hydroxide solution (10 wt % aqueous solution). Lastly, the batch was dispensed from the unpressurized vessel via a 250 μm sieve.

In the experiment, the mixture for polymerization was introduced at the bottom end of the tubular reactor (1) and the product was withdrawn at the top end.

The initiator metering rates were (9a) 0.11 kg/h
(9b) 0.11 kg/h
(9c) 0.21 kg/h
(9d) 0.30 kg/h
(9e) 0.40 kg/h The transit rate was around 20 liters/h. The stirrer speed was 800 revolutions/minute. The pressure in the reactor (1) was established at bar via the transfer valve (7a).

Example 1, Comparative

Figure 2:
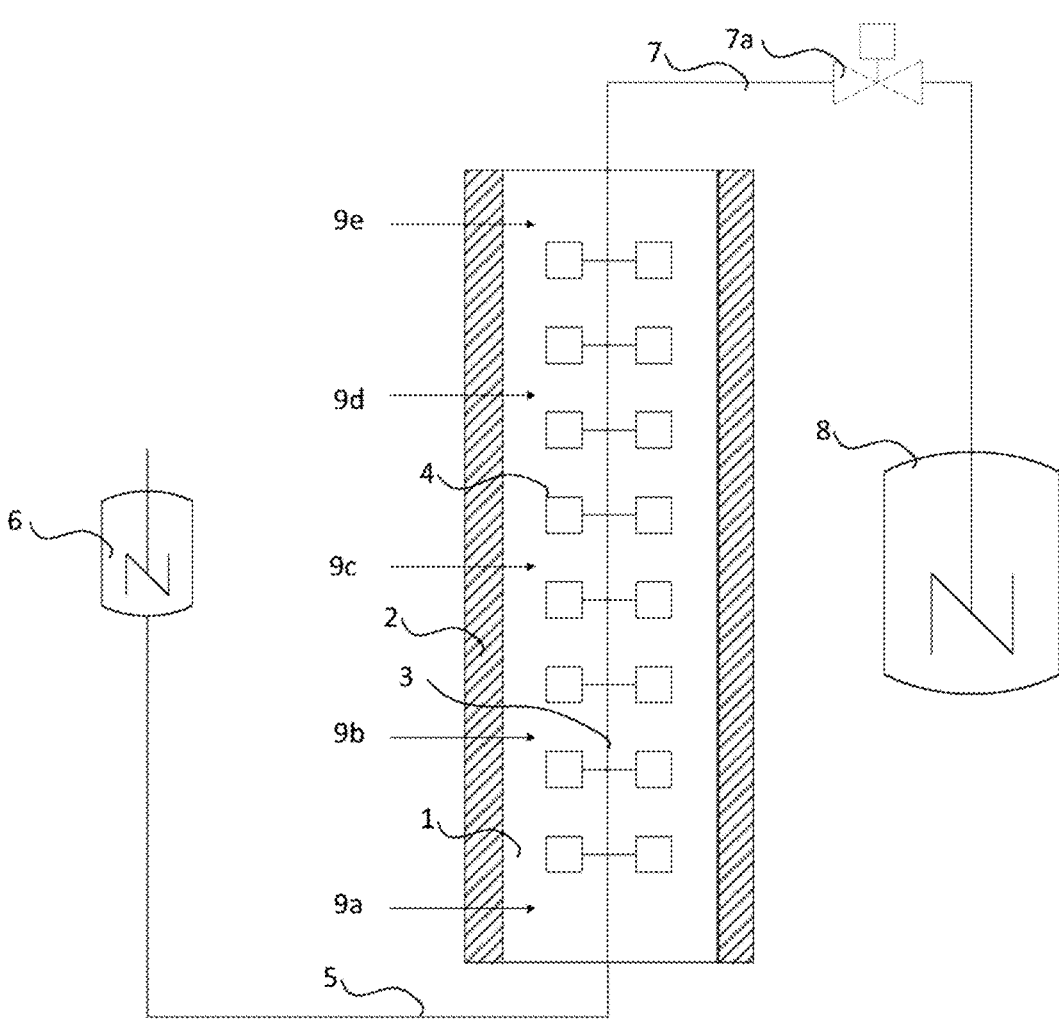
FIG. 2 is a schematic illustration of a tubular reactor according to an embodiment of the disclosure for use in a process according to an embodiment of the disclosure.

The emulsion polymerization was carried out in a plant according to FIG. 2. The tubular reactor (1) had no dividing plates and was operated with eight stirrer blades (4) in 4 planes.

After 30 h, the polymerization was ended and the free volume of the tubular reactor (1) was determined by making up with water and weighing the amount of water. With this approach, the reactor volume was ascertained at 8.75 liters. After 30 h, therefore, the reactor lost 3.75 liters of volume, synonymous with a corresponding buildup of wall deposits to an extent of 30% of the reactor volume.

During the experiment, samples were taken hourly. In this case the particle size distribution proved to be highly unstable; mono- and bimodal distributions were observed and the Beckmann Coulter Dw value fluctuated between 1000 and 6000 nm. Fluctuations were likewise observed in the solids content and conversion; the conversion was consistently <90%.

Overall it was not possible to achieve stable operating conditions or sufficient product quality. Because of the increasingly uneven temperature distributions in the reactor, as a consequence of the fouling which was already very heavy zonally, the experiment was discontinued after 30 h.

Example 2

The emulsion polymerization was carried out in a plant according to FIG. 1. The tubular reactor (1) was divided by 9 dividing plates (10) into 10 cells having a height of 160 mm. The stirring assembly (3) was implemented with double-bladed stirrers (4) with dimensions of 50×50 mm, so that a stirrer (4) was seated centrally in each cell. The reactor jacket, including the metering points, was left unaltered. The stirrer speed continued to be 800 rpm.

After 30 h, the polymerization was ended and the free volume of the tubular reactor (1) was determined by making up with water and weighing the amount of water. With this approach, the reactor volume was ascertained at 11.3 liters, meaning that after 30 h the tubular reactor (1) lost 1.2 liters of volume, synonymous with a corresponding buildup of wall deposits to an extent of <10% of the vessel volume.

During the experiment, samples were taken hourly. After a short onset time, the product quality proved to be very constant. The particle size distribution obtained was monomodal and was stable throughout the experiment. The residual monomer content after the tubular reactor (1) was 5%. An end product was obtained with properties as follows:

| | |
|---|---|
| Solids content | 58.5%, |
| pH | 4.5, |
| Viscosity (Brookfield at 23° C. and 20 rpm) | 1500 mPas, |
| Particle size distribution Dw (Beckmann Coulter) | 1300 nm, |
| Glass transition temperature (DSC according to ISO 11357) | 16° C. |

Example 3

The emulsion polymerization was carried out in the same plant and according to the same process as example 2, with the difference that guide plates (14) were mounted on both sides at the liquid-permeable openings (13) in the dividing plates (10), as shown in FIG. 3. The length L of the guide plates in the principal direction of flow was 1.5 times the free diameter of the liquid-permeable openings (13) in the dividing plates.

After 30 h, the polymerization was ended and the free volume of the tubular reactor (1) was determined by making up with water and weighing the amount of water. With this approach, the reactor volume was ascertained at 11.5 liters, meaning that after 30 h the tubular reactor (1) lost 1.0 liters of volume, synonymous with a corresponding buildup of wall deposits to an extent of <10% of the vessel volume.

During the experiment, samples were taken hourly. After a short onset time, the product quality proved to be very constant. The particle size distribution obtained was monomodal and was stable throughout the experiment. The mean particle size corresponded to the mean particle size of the batch product. The residual monomer content after the tubular reactor (1) was <5%. An end product was obtained with properties as follows:

| | |
|---|---|
| Solids content | 58.5%, |
| pH | 4.5, |
| Viscosity (Brookfield at 23° C. and 20 rpm) | 1500 mPas, |
| Particle size distribution Dw (Beckmann Coulter) | 1100 nm, |
| Glass transition temperature (DSC according to ISO 11357) | 16° C. |

The invention claimed is:

1. A process for preparing vinyl acetate-ethylene copolymers, comprising:

providing an aqueous dispersion of vinyl acetate-ethylene copolymers;

subjecting the aqueous dispersion of vinyl acetate-ethylene copolymers to radically initiated emulsion polymerization in a continuously operated tubular-reactor; and providing one or more dividing plates bearing liquid-permeable openings that are mounted in the tubular-reactor transverse to the flow direction of the reactor contents.

2. The process of claim 1, wherein the tubular-reactor contains 3 to 30 of the one or more dividing plates.

3. The process of claim 1, wherein there is no liquid-permeable gap between dividing plates and inner tubular-reactor wall.

4. The process of claim 1, wherein the one or more dividing plates are connected to one another by one or more bars.

5. The process of claim 4, wherein a construct comprises adjacent one or more dividing plates and one or more bars that are fastened on a floor of the tubular-reactor and/or on a cover of the tubular-reactor.

6. The process of claim 1, wherein the tubular-reactor contents traverse the one or more dividing plates exclusively through one or more liquid-permeable openings.

7. The process of claim 1, wherein the one or more dividing plates each have only one liquid-permeable opening.

8. The process of claim 1, wherein one or more guide plates are mounted at the edge of one or more liquid-permeable openings in the one or more dividing plates.

9. The process of claim 8, wherein a guide plate projects only into one or into both of the cells divided by a dividing plate.

10. The process of claim 8, wherein the one or more guide plates are mounted on the side of the dividing plate that lies downstream in the flow direction of the reactor contents.

11. The process of claim 8, wherein the one or more guide plates project by the length L into the two cells divided by a dividing plate and the ratio of the length L of a guide plate to a free diameter of a liquid-permeable opening is ≥0.25 and ≤10.

12. The process of claim 1, wherein the tubular-reactor comprises a stirring assembly which comprises a stirrer shaft on which one or more stirrer blades are mounted; and wherein the stirrer shaft is routed through a liquid-permeable opening in one or more dividing plates.

13. The process of claim 12, wherein the stirrer shaft does not completely fill a liquid-permeable opening in one or more dividing plates.

14. The process of claim 12, wherein the stirrer shaft extends from one longitudinal end to the other longitudinal end of a tubular-reactor.

15. The process of claim 1, wherein one or more baffles are mounted in the tubular-reactor axial to the flow direction of the reactor contents.

16. The process of claim 1, wherein the flow direction of the tubular-reactor contents is not reversed in the tubular-reactor.

* * * * *